July 17, 1962  F. C. McMANUS  3,044,832
FLUID STABILIZING MEANS FOR SEMI-TRAILER TILTING BODIES
Filed March 13, 1958                                   2 Sheets-Sheet 1
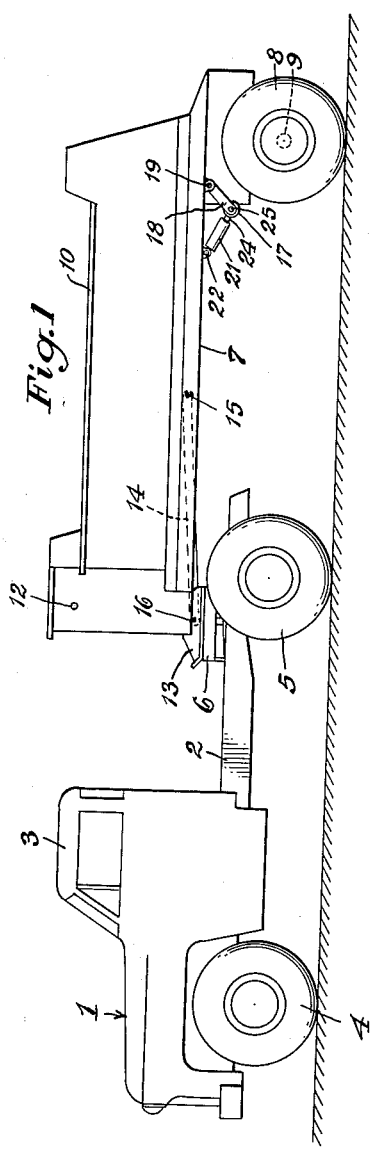
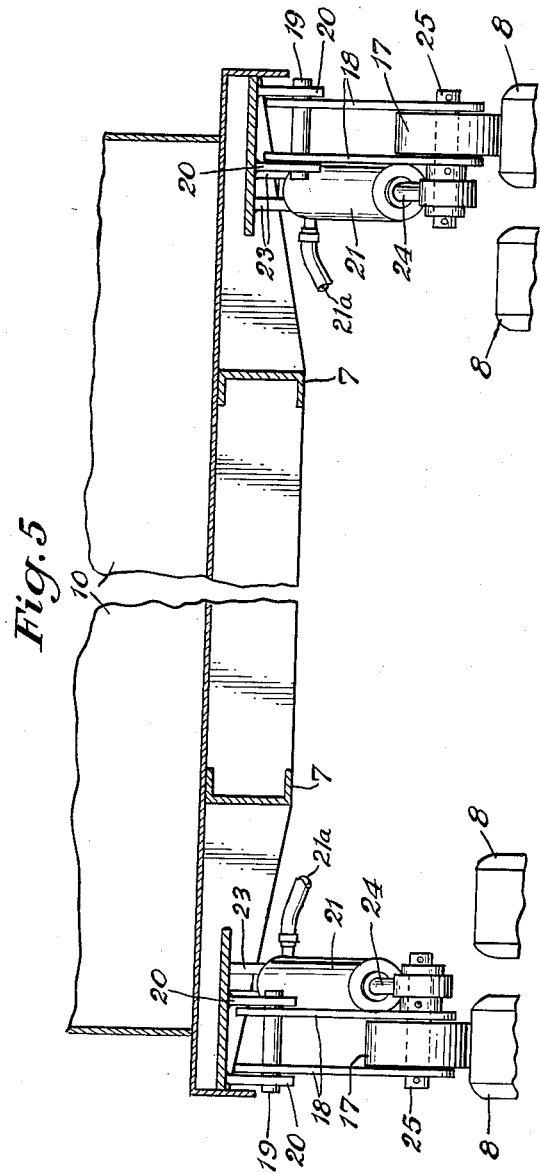
Inventor
Frank C. McManus
by Parker & Carter
Attorneys July 17, 1962 F. C. McMANUS 3,044,832
FLUID STABILIZING MEANS FOR SEMI-TRAILER TILTING BODIES
Filed March 13, 1958 2 Sheets-Sheet 2

Inventor
Frank C. McManus by Parker & Carter
Attorneys

United States Patent Office 3,044,832
Patented July 17, 1962

3,044,832
FLUID STABILIZING MEANS FOR SEMI-TRAILER TILTING BODIES
Frank C. McManus, Streator, Ill., assignor to Anthony Company, Streator, Ill., a corporation of Illinois
Filed Mar. 13, 1958, Ser. No. 721,243
4 Claims. (Cl. 298—17)

This invention relates to a tipping or dumping body and to a stabilizing means therefor. It has for one object to provide means for stabilizing a body or receptacle mounted for tipping, the stabilizing means being effective primarily when the body or receptacle is in the tipped position.

Another object is to provide means in connection with a tipping vehicle or receptacle whereby when the body or receptacle is tipped stabilizing means are automatically effective.

Another object is to provide manual means for actuating a stabilizer in connection with a tipping body or receptacle.

Another object is to provide pressure fluid means for automatically stabilizing a receptacle during tipping, said pressure fluid means being in circuit with a tipping means for the receptacle.

Other objects will appear from time to time throughout the specification and claims.

The invention is illustrated more or less diagrammatically in the accompanying drawings wherein:

FIG. 1 is a side elevation of one form of the device associated with a tractor-trailer combination, showing the parts in untipped position;

FIG. 5 is a transverse sectional detail on an enlarged scale showing the stabilizing advantage and taken at line 5—5 of FIG. 2.

Like parts are designated by like characters throughout the specification and drawings.

In the particular form here shown the device is associated with a tractor-trailer combination. Only so much of the tractor is shown and described as is necessary for an understanding of the invention.

Figure 2:
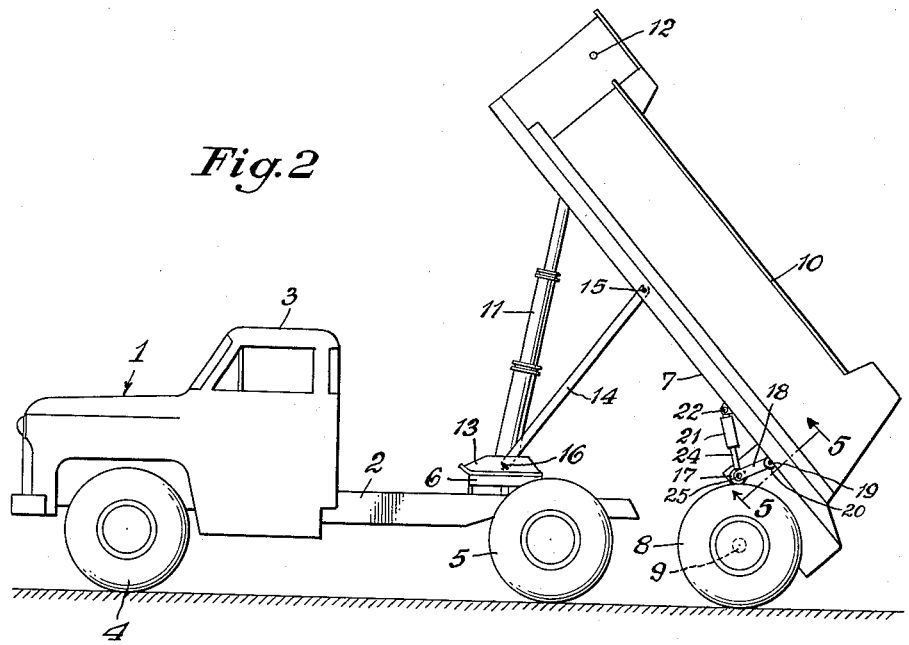
FIG. 2 is a side elevation of the structure of FIG. 1 showing the body in tipped position.

As shown in FIGS. 1 and 2, a tractor 1 is combined with a trailer. The tractor includes a frame 2, a cab 3, front wheels 4 and rear wheels 5. The tractor may include a fifth wheel 6 of more or less conventional design fixed upon the tractor.

Associated with the tractor, preferably separable, is a trailer. As shown, the trailer comprises a frame or frame-like structure 7. Wheels 8 support the frame adjacent its rear end. These wheels may be of conventional design and carried on axles indicated only diagrammatically, as at 9.

A body or receptacle 10 is mounted on and secured to the frame 7. At its forward end the body has secured to it a piston and cylinder assembly indicated generally by the numeral 11. The uppermost member of the piston and cylinder assembly is preferably pivoted to the body 10 as at 12. At its lower end the piston and cylinder assembly is mounted on what may be called an upper fifth wheel 13 which is preferably removably engaged upon the fifth wheel 6. Traction means 14 are secured to the body 10 or the frame 7. As shown, the traction means may be pivoted to the frame 7, as at 15, and they may be pivoted at their opposite ends upon the upper fifth wheel 13 as at 16.

The traction means may comprise draft links or any member through which traction or draft power may be supplied to cause the body and tractor to have the relative movements described below.

The stabilizing means mentioned herein have the primary purpose of providing a stabilizing effect for the tipping body or receptacle when the latter is in tipped position. When the body 10 is in the untipped or generally horizontal position of FIG. 1, the stabilizing effect is not required as the tipping tendency is slight. When, however, the body is in the raised or tipped position, particularly as shown in FIG. 2, it is less stable. Raised as it is to a high position and to a steep angle, it presents a substantial area to wind pressure and it is relatively unstable during the tipping position. Unless the supporting wheels of the trailer, in particular, and also the supporting wheels of the tractor are on a completely level surface, instability is present and this, together with wind pressure which may be effective on the side of the receptacle or body 10, may result in upsetting the vehicle assembly or the trailer alone.

In a typical support such as that provided by the wheels 8, the width of the frame 7 and hence the width of the support effective to prevent lateral overturning of the body 10 is approximately 35 inches. Where pairs of wheels or double wheels are mounted on the axle 9 the outermost wheel of each pair will be approximately 85 inches between centers. If this 85 inch dimension can be used during tipping as a stabilizing means, the tipping body or receptacle is greatly strengthened or reinforced against lateral tipping. It is an important object of the invention to provide means, automatic or manual, for utilizing the full width of the wheels at the rear of the trailer to give the greatest possible lateral stabilizing effect.

To accomplish the stabilizing effect means are provided to contact the wheels of the trailer when the vehicle is tipped. If single wheels are provided they are contacted and since they are farther apart than the frame or structure upon which their axle is supported, an advantage in the direction of stabilization is accomplished. If double wheels are provided for the trailer and the outermost wheel is contacted by the stabilizing means, the added stabilizing effect is further increased.

Whether the wheels 8 be single or double, the stabilizing means is arranged to contact them and to utilize their width in stabilizing. To this end rollers 17 are positioned between links 18 at each side of the body or receptacle 10. The links 18 are pivoted as at 19 on supports 20 which are secured to the frame 7. Cylinders 21 are pivoted as at 22 by means of bearing supports 23 which are secured to the frame 7. Each cylinder 21 contains a piston, not shown, from which a piston rod 24 extends. This piston rod is movably secured to the shaft 25 of the rollers 17. When the piston is drawn in, as in FIGS. 1 and 3, the rollers 17 are held out of contact with the wheels 8. When the piston is extended, as shown in FIG. 2, the rollers are moved so that they are brought into contact with the wheels 8. Therefore, as the body is tipped and thus moves toward, and finally to the position of least stability, the stabilizers become effective and the rollers contacting the wheels 8 widen the base of support of the body and very substantially increase its stability.

Means are provided for furnishing pressure fluid to the main tipping piston and cylinder assembly 11. These means may comprise a pump and controls situated on the tractor and driven, if desired, by the tractor engine. Conduits, not shown, are provided for moving pressure fluid to and from the piston and cylinder assembly 11. A sump and other conventional parts may be included, if desired. These are not shown as their details form no essential part of the invention and they are well known in the trade today. For many purposes it is convenient to use as a source of pressure fluid actuating the movement of the pistons within the cylinders 21, the same source of pressure fluid as that which actuates the main hoisting piston and cylinder assembly. When that is done, conduit means 21a are provided so that pressure fluid is directed to the cylinders 21 and the pistons within these cylinders are actuated automatically to bring the rollers 17 in contact with the wheels 8 upon the occurrence of the tipping movement in which the body 10 is moved from the untipped position of FIG. 1 to the tipped position of FIG. 2. These various conduits and controls are not shown but it is to be understood that in the forms of the first three figures the cylinders 21 are in fluid circuit with the piston and cylinder asesmbly 11 so that the stabilizing and the tipping means are actuated in predetermined relation with each other. Thus when the tipping means operate to tip the body, the stabilizing means operate automatically to stabilize it.

Figure 3:
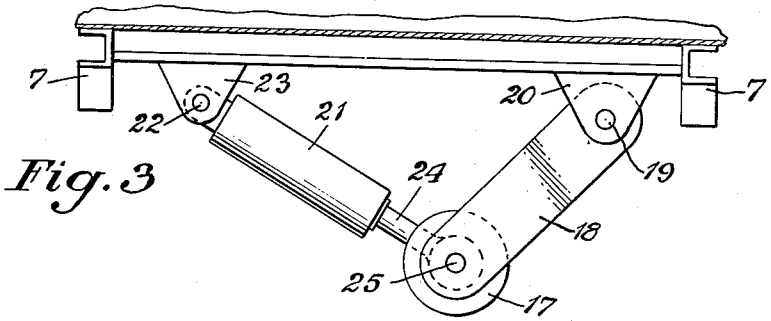
FIG. 3 is a side elevation on an enlarged scale showing one form of the stabilizing mechanism.
Figure 4:
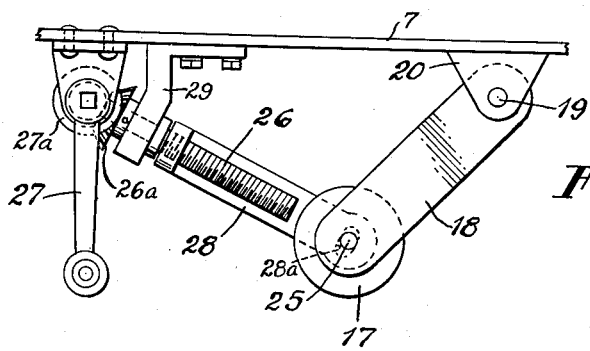
FIG. 4 is a side elevation on an enlarged scale showing a modified or manually operated form of stabilizing means.

For some purposes, and particularly to simplify the assembly, it may be desirable to provide manual means for operating the stabilizers. For that purpose the structure of FIG. 4 is shown. This structure is generally similar to the structure of FIG. 3 except that the members 18 are moved, not by the piston and cylinder arrangement, but by the crank and screw arrangement which embodies a screw 26 and a crank 27. The screw 26 is journalled in a bracket 29 supported on the frame 7 and is in threaded relationship with a member 28 which moves the shaft 25 and thus moves the rollers 17. When the body is to be tipped by the mechanism of FIG. 4, the crank is operated to rotate the screw 26 through a bevel gear arrangement 26a, 27a which in turn moves or extends the member 28 and moves the rollers 17 into contact with the wheels 8. Member 28 is connected to shaft 25 of roller 17 through lost motion slot 28a in the end of member 28, which shaft 25 is positioned in links 18. The members 8 have been referred to as wheels. They are, of course, equipped with tires and the word "wheels" has been used generally to indicate the rotary supporting members including the wheels and their tires. Actually in the case of the ordinary truck and trailer assembly the rollers of the stabilizing means come into contact with the tires rather than with the wheels themselves. Therefore, when reference is made to the contact of any part of the stabilizing means with "the wheels" this language is to be taken as meaning a contact of the stabilizing means with the trailer-supporting mechanism such as wheels with or without tires, or any rotary ground-contacting supporting means.

Although an operative form of the device has been shown, the invention is not limited to the particular details shown. Many changes may be made in the form, shape and arrangement of parts without departing from the spirit of the invention.

It is preferable when the hydraulic cylinder 21 is used to move the rollers 17 into contact with the wheels or tires 8 to have the hoisting or tipping cylinder 11 and the cylinder 21 so connected that they operate simultaneously. When the valve to raise the body is open and pressure fluid is directed to the tipping cylinder 11, it is also, and simultaneously, directed to the stabilizing cylinder 21 and the rollers 17 are thus moved promptly into contact with the tires 8 as soon as the body begins to rise. Thus the stabilizing effect is caused to become active as soon as tipping begins and the body is stabilized throughout the full tipipng action.

The use and operation of the invention are as follows: The device in the particular form shown is applied to a tipping tractor-trailer combination. As shown, the trailer is tipped by the expansion of the piston and cylinder assembly and when the trailer moves from untipped to tipped position, the trailer and tractor move toward each other. Under normal conditions both the trailer and the tractor are provided with brakes. If the brakes of the tractor are set when tipping commences, the trailer will move toward the tractor. If, however, the brakes of the tractor are not set and the brakes of the trailer are, the tractor will then tend to move toward the trailer. This latter result is generally preferred when the trailer is dumping into a fixed container. In that case the trailer is backed until its wheels contact the container or the container wall. Its brakes are then set and the hoisting mechanism is started to tip the body. As the tipping takes place the tractor, whose brakes are not set, moves toward the trailer.

It is possible and sometimes desirable to tip the trailer when it is immaterial whether the trailer or the tractor moves. In that case the brakes of each may be left free and each may move toward the other. Whatever the particular braking arrangement, the tractor and trailer have relative movement toward each other during tipping and relative movement away from each other when the tipping is over and the parts returned to the untipped position.

Under normal road conditions, in the untipped position the center of support at the rear of the trailer is relatively narrow as shown in FIG. 5. The base of support of the trailer on its running gear in the untipped position is determined by the width of the frame. It is determined by the distance between the frame members 7, which, as shown in FIG. 5, is relatively narrow. With so narrow a base the trailer, when tipped, has a minimum of stability and as it rises to the tipped position it presents a wide area to wind pressure and develops an increasing susceptibility to tipping over as the result of wind pressure or other causes. This instability is greatly reduced by the stabilizer of the present invention. As shown also in FIG. 5, when the rollers 17 are brought into contact with the wheels or tires 8 the base of support of the trailer is more than doubled. Thus by the mechanism shown, when the body is moved into the tipped position its base of support is very substantially widened and its degree of stability is correspondingly increased. This is true whether the device operates as shown in FIGS. 1, 2 and 3 in which the cylinder 21 is present and the rollers 17 are moved by pressure fluid into contact with the parts 8, or the device is moved by hand by means of a crank and screw arrangement. The crank and screw arrangement could, of course, be operated mechanically by a fluid motor or by an electric motor supplied with current, if desired, from the battery or generator of the truck.

I claim:

1. In combination in a vehicle, a load-carrying member, ground-contacting wheels supporting said load-carrying member including an axle, means on said vehicle for tipping said load-carrying member about said wheels, stabilizing means including rotary stabilizing members mounted on said load-carrying member and positioned above said wheels when said load-carrying member is in normal running position, and means on said load-carrying member for moving said stabilizing members into contact with said wheels and for maintaining said contact through at least a major portion of the tipping of said load-carrying member, said rotary stabilizing members rolling about and in contact with said wheels as the load-carrying member tips.

2. The combination of claim 1 further characterized by power means for moving said stabilizing members into contact with said wheels.

3. The combination of claim 1 further characterized by pressure fluid means for moving said stabilizing members into contact with said wheels.

4. The combination of claim 1 further characterized by a pivotal arm mounted on each side of said load-carrying member, a rotary stabilizing member being mounted on each of said arms, and a piston and cylinder assembly pivotally connected to each side of said load-carrying member and effective to pivotally move said stabilizing members into contact with the wheels.

References Cited in the file of this patent

UNITED STATES PATENTS

| | | | |
|---|---|---|---|
| 637,005 | Knudsen | Nov. 14, | 1899 |
| 1,610,881 | Reinsch | Dec. 14, | 1926 |
| 1,767,470 | Mitchell | June 24, | 1930 |
| 2,072,998 | Allin | Mar. 9, | 1937 |
| 2,530,574 | Getman | Nov. 21, | 1950 |
| 2,628,126 | Black | Feb. 10, | 1953 |
| 2,635,919 | Watson | Apr. 21, | 1953 |
| 2,661,236 | Schonrock | Dec. 1, | 1953 |
| 2,678,828 | Bell | May 18, | 1954 |
| 2,780,322 | Hickle | Feb. 5, | 1957 |
| 2,798,736 | Larkin | July 9, | 1957 |
| 2,815,980 | Harbers et al. | Dec. 10, | 1957 |
| 2,861,837 | Morse | Nov. 25, | 1958 |
| 2,868,583 | Harbers et al. | Jan. 13, | 1959 |

FOREIGN PATENTS

| | | | |
|---|---|---|---|
| 2,219 of 1866 | Great Britain | Feb. 27, | 1867 |
| 501,680 | Italy | Nov. 25, | 1954 |